United States Patent [19]
Blakeley et al.

[11] Patent Number: 5,826,077
[45] Date of Patent: Oct. 20, 1998

[54] APPARATUS AND METHOD FOR ADDING AN ASSOCIATIVE QUERY CAPABILITY TO A PROGRAMMING LANGUAGE

[75] Inventors: Jose Alfredo Blakeley; Craig W. Thompson, both of Plano, Tex.

[73] Assignee: Texas Instruments Incorporated, Dallas, Tex.

[21] Appl. No.: 837,396

[22] Filed: Apr. 17, 1997

Related U.S. Application Data

[63] Continuation of Ser. No. 639,808, Apr. 29, 1996, abandoned, and Ser. No. 473,622, Jun. 7, 1995, abandoned, which is a continuation of Ser. No. 516,369, Apr. 30, 1990.

[51] Int. Cl.$^6$ ........................................... G06F 17/30
[52] U.S. Cl. ........................................... 395/604
[58] Field of Search ........................... 395/604, 611, 395/614, 700

[56] References Cited

U.S. PATENT DOCUMENTS

| | | | |
|---|---|---|---|
| 4,894,771 | 1/1990 | Kunii et al. | 395/600 |
| 4,914,590 | 4/1990 | Loatman et al. | 364/419 |
| 4,961,133 | 10/1990 | Talati et al. | 395/700 |
| 5,067,072 | 11/1991 | Talati et al. | 395/650 |
| 5,091,852 | 2/1992 | Tsuchida et al. | 395/600 |

OTHER PUBLICATIONS

Noack et al., "Memopascal: Einbettung einer Datenbankanfragesprache in einer hohere Programmier sprache," Applied Informatics, v.29, n.4, Apr. 1987, pp. 149–156.

Alashqur et al., "QQL: A Query Language for Manipulating Object–Oriented Databases," Proc. of the Fifteenth Internat'l Conf. on Very Large Databases, Aug. 1989, pp. 433–442.

Barabino et al., "A Module for Improving Data Access and Management in an Integrated CAD Environment," 22nd ACM/IEEE Design Automation Conf., Jun. 1985, pp. 577–583.

Beech, D., "A Foundation for Evolution from Relational to Object Databases," Advances in Database Technology—EDBT of 1988, v. 303 (Springer–Verlach), pp. 251–270.

Cluet et al., "Reloop: An Algebra Based Query Language for an Object–Oriented Database System," Proc. of the $1^{st}$ Internat'l Conf. on Deductive and Object–Oriented Databases, Dec. 1989.

Agrawal et al. "ODE (Object Database and Environment): The Language and the Data Model," ACM–SIGMOD Internat'l Conf. on Management of Data, May–Jun./1989.

*Primary Examiner*—Thomas G. Black
*Assistant Examiner*—Maria N. Von Buhr
*Attorney, Agent, or Firm*—W. Daniel Swayze, Jr.; W. James Brady, III; Richard L. Donaldson

[57] ABSTRACT

An object-oriented query language apparatus and method provides data abstraction, seamlessness with respect to the host programming language, set support orthogonal to persistence and strong typing. Such apparatus for processing queries includes a preprocessor to parse, optimize, and translate object query language statements into efficient host language statements, connected to a compiler that compiles such host language statements into executable code. Therefore, by inputting a program containing statements using a host language's type system as well as employing the host language's expressions, object composition, and inheritance in the formulation of queries, and by combining the Select-From-Where style of Standard Query Language as a basic structure for query statements with the set-valued function of the host language as targets for those queries, an associative query capability is added to a host programming language, thereby improving its versatility and functionality.

29 Claims, 6 Drawing Sheets

Fig. 1

| PERSON | NAME | SSN | AGE | ADDRESS |
|---|---|---|---|---|
| | NORMAN BENSON | 381-61-3213 | 24 | 124 KILBY ROAD |
| | KATHERINE WRIGHT | 472-93-6785 | 25 | 4105 WOODBRIDGE DR. |
| | ARNOLD SMITH | 524-15-9332 | 32 | 156 BETLINE ROAD |

| PERSON | NAME | SSN | AGE | ADDRESS | CHILDREN | |
|---|---|---|---|---|---|---|
| | | | | | NAME | AGE |
| | NORMAN BENSON | 381-61-3213 | 24 | 124 KILBY ROAD | JOHN | 2 |
| | | | | | KATHY | 3 |
| | KATHERINE WRIGHT | 472-93-6785 | 25 | 4105 WOODBRIDGE DR. | NIL | |
| | ARNOLD SMITH | 524-15-9332 | 32 | 156 BETLINE ROAD | LUCY | 2 |
| | | | | | NORA | 4 |
| | | | | | DAVID | 6 |

```
class OQL_Set_Type {
  private:
    type_namePTR ptr_array[maxsize]
    List <Index> * index:
    LIST <Iterator> * iterator:
  PUBLIC:
    OQL_Set_Type();
    ~OQL_Set_Type();
```
— 42

```
    Boolean find (const Type&):
    Boolean (const Type&):
    Boolean add (const Type&):
```
— 44

```
    Iterator_id create_iterator();
    Boolean destroy_iterator(Iterator_id);
    Boolean reset (Iterator_id);
    Boolean next (Iterator_id);
    Type & value (Iterator_id);
```
— 46

```
    Boolean is_subset (OQL_Set_Type &);
    OQL_Set_Type & set_union (Type &);
    OQL_Set_Type & set_intersection (Type &);
    OQL_Set_Type & set_difference (Type &);
```
— 48

```
    Boolean create_index (member_function_name, index_type);
    Boolean destroy_index (member_function_name, index_type);};
```
— 50

```
class Name{
  public:
    Name(char *f, char *1){first=f; last=1;}
    char * first;
    char * last ;};
```
80

```
class Birthdate{
  public:
    Birthdate ( int m, int d, int y ){ day=d; month=m;year=y;}
                int day, month, year ;};
```
82

```
class Insurance{
  public:
    Insurance( char *co, int p, int c ) {
                company =co; policy=p; coverage =c;}
    char * company;
    int policy;
    int coverage ; };
```
84

Fig. 5a

```
class Person {
private:
    Name *name; char *Birthdate *birthdate; int ssn;
public:
    Person( Name *n, char *a, Birthdate *b, int s ) {
            name =n; address =a; birthdate =b; ssn=s;}
    Name *get_name( );
    char *get_address( );
    int get_age ( );
    void set_name(Name *);
    void set_address ( char *);
    void set_birthdate(Birthdate *);   };
```
86

```
class Physician; public Person{
private:
    char *license; char *specialty; set<Patient> * p_set;
public:
    Physician ( Name *n, char *a, Birthdate *b, int s ) {
            char *1, char *sp );
    char *get_license ( );
    char *get_specialty( );  };
```
88

```
class Patient : public Person {
private:
    Insurance *insurance; Physician *physician;
    Set < Medical_Record> med_record;
public:
    Physician ( Name *n, char *a, Birthdate *b, int s,
                Insurance *i, Physiciane *p );
    Insurance *get_license ( );
    Physician *get_physician ( );  };
```
90

Fig. 5b

```
1.  # include      # <OQL_Set.h>       // header file containing templates
2.  DECLARE        OQL_Set<Patient>    // declares a set
3.  IMPLEMENT      OQL_Set<Patient>    // defines functions of a set
    ...
4.  main( )
5.  {
6.  OQL_Set<Patient> mypatients; result;
7.  Patient   p1, p2
7                                      // code that creates instances of
7                                      // of patients not shown
8.  mypatients.add( p1 );              // add a member to the set
9.  ...
10. mypatients.reset( );
11. for ( Boolean t= mypatients.next( ): t;=mypatients.next( ) ) {
12.     p2 = 12. mypatients.value( );
        ...
13. };
13  13
14. result =SELECT p FROM Patient *p IN mypatients // query of Ex. 6
            WHERE EXIXTS (
                SELECT * FROM X_Ray_Set *r IN Make_set( f( p ) )
                WHERE x_ray_match( r->picture( ),*pattern)
                )
15. };
16. x_Ray_List *f( Patient * p ) {
    ...
17. }
18. X_Ray_Set *  Make_set ( X_Ray_List * 1 ) {
18  ...
19. }
```

APPARATUS AND METHOD FOR ADDING AN ASSOCIATIVE QUERY CAPABILITY TO A PROGRAMMING LANGUAGE

This application is a Continuation of application Ser. No. 08/639,808, filed Apr. 4, 29, 1996 now abandoned, and a Continuation of application Ser. No. 08/473,622 filed Jun. 7, 1995 now abandoned, which is a Continuation of application Ser. No. 07/516,369, filed Apr. 30, 1990 now pending.

NOTICE

© Copyright 1990 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or record, but otherwise reserves all copyright rights whatsoever.

BACKGROUND OF THE INVENTION

1. Field of the Invention

This invention relates to object-oriented programming languages and object-oriented database management systems, and more specifically to a language for querying collections of objects modeled using a host programming language which may in turn be stored in an object-oriented database system.

2. Description of Related Art

Figure 1:
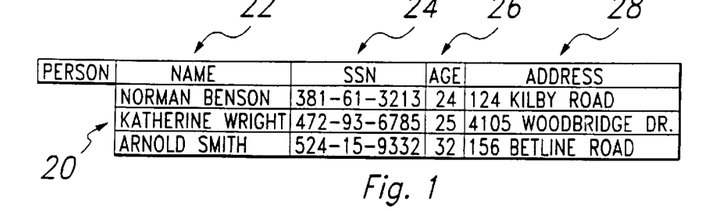
FIG. 1 is a block diagram demonstrating an example of a table in the relational model of data in the current art.

The relational model represents the data in a database as a collection of relations. Informally, each relation resembles a table. Each row in a table represents a collection of related data values that can be interpreted as a fact describing an entity in the real world. Each table and column in a relational database has a name. These names are used to help to interpret the meaning of the values contained in each row of a table. For example, table 20 in FIG. 1 is called Person because each of its rows represents facts about a particular person. The column names Name 22, SSN 24, Age 26, and Address 28, specify how to interpret the data values in each row based on the column to which each value belongs. All values in a column are of the same type.

In relational database terminology, a table is called a relation, a column name is an attribute, and a row is known as a tuple. Relations are described by means of a relation schema denoted by $R(A_1, A_2, \ldots, A_n)$, where R is the relation name, and $A_1, A_2, \ldots, A_n$ are attributes. For example, the schema of the Person relation of FIG. 1 is Person(Name, SSN, Age, Address).

In a relational database, data is defined, queried, and updated using a database language. The data definition part of the language is referred to as the data definition language (DDL) and the query and update parts of the language are referred to as the data manipulation language (DML).

Every commercial relational database management system (DBMS) comes equipped with a database language. The best known is Structured Query Language (SQL) created as the database language for the International Business Machines (IBM) System R relational DBMS prototype, and now an ANSI database language standard for relational DBMSs. Although QUEL is another well-known database language (devised for the the INGRES relational DBMS prototype developed at the University of California at Berkeley), SQL is more widely used as a relational query language.

SQL commands for data definition in the database are CREATE TABLE (specifies a relation schema), ALTER TABLE (adds an attribute to a schema), and DROP TABLE (deletes a schema). Examples of these SQL data definition statements for the Person relation of FIG. 1 would be:

```
CREATE TABLE Person (  Name     VARCHAR(30)   NOT NULL,
                       SSN      CHAR(9)       NOT NULL,
                       Age      INTEGER,
                       Address  VARCHAR(40)
                    );
DROP TABLE Person;
ALTER TABLE Person ADD Salary INTEGER;
```

Once the database has been defined, the SELECT statement in SQL is used to retrieve information from the database. The basic form of the SELECT statement, is built from three clauses SELECT, FROM, and WHERE as follows:

SELECT <attributes>
FROM <tables>
WHERE <predicate>;

where <attributes> is a list of attribute names whose values are to be retrieved by the query, <tables> is a list of relation names containing the data to be retrieved, and <predicate> is a Boolean predicate that specifies a constraint to be satisfied by the tuples to be retrieved.

For example, the SQL query required to retrieve the name and address of all persons less than 30 years old is:

SELECT Name, Address
FROM Person
WHERE Age <30;

Unfortunately SQL, like other current query languages has several disadvantages, particularly when used to query object-oriented data. These disadvantages originate from the fact that it was designed as an interface to a relational model which handles only simple objects (tuples) and not composite objects. As a result, it does not handle inheritance or data abstraction, is not tightly coupled with a programming language and does not support strong typing.

TABLE 1

An example of SQL embedded in C.

```
1.  EXEC SQL BEGIN DECLARE SECTION;
2.     VARCHAR name[30];
3.     VARCHAR address[40];
4.  EXEC SQL END DECLARE SECTION;
5.  EXEC SQL INCLUDE SQLCA;
6.
7.  main()
8.  {
9.     EXEC SQL DECLARE C1 CURSOR FOR
           SELECT NAME, ADDRESS FROM PERSON
           WHERE AGE < 30;
10.    EXEC SQL OPEN C1
11.    EXEC SQL WHENEVER NOT FOUND GOTO nomore;
12.    while(1)
13.    {
14.       EXEC SQL FETCH C1 INTO :name,:address;
15.       /* do something with this tuple */
16.    }
17. nomore:
18.    EXEC SQL CLOSE C1;
19.    /* continue with program following the SQL quere */
20. }
```

SQL can be used in conjunction with a general-purpose programming language such as C, FORTRAN, or COBOL. Such programming language is called the host language. An SQL statement can be embedded in a host language. An embedded SQL statement is distinguished from host language statements by prefixing it with a special keyword so that a preprocessor can separate the embedded SQL statements from the host language statement. For example, the keywords EXEC SQL precede any embedded SQL statement in the C host language. The program fragment shown in Table 1 illustrates the way in which SQL is embedded in a C program to retrieve the name and address of all persons less than 30 years old.

The difference between the type systems of the host language and the embedded query language is normally highly visible to the application programmer resulting in several problems. First, strong typing is lost at the database interface. Strong typing in a programming language guarantees that the arguments of functions are type-correct; a programming language with strong typing is viewed as safer and more efficient than one that does not support enforcement of types. In current SQL embeddings, the representation of the host language and the database query language are different and the programmer must break strong typing to copy his data to the database. Experimental persistent programming languages correct this problem, but they lack query extensions. Second, query languages including embedded SQL can only formulate queries to retrieve persistent database objects (i.e., data stored in the relational database) to the program's memory space. It is not possible to query transient data, which stored only on the main memory of the computer existing only during a single execution of a program, or against persistent objects after they enter the program's memory space. Third, host language statements (e.g., user-defined functions written in the host language) cannot be used in queries and queries cannot be freely mixed with host language statements (e.g., as parameters to functions) and they must obey specific protocols. Fourth, programming languages typically do not provide SET type as one of their basic types. Consequently, the complete set of objects returned by a query cannot be made available to a program. It is only possible to make one tuple at a time available to the program. The concept of a cursor (Statement 9 of Table 1) used in all embeddings of SQL in host languages enforces this tuple-at-a-time processing (Statements 12–16 of Table 1). Finally, the syntax and semantics of the query and host languages are completely different, and the programmer has to learn and be aware of these differences.

Figure 2:
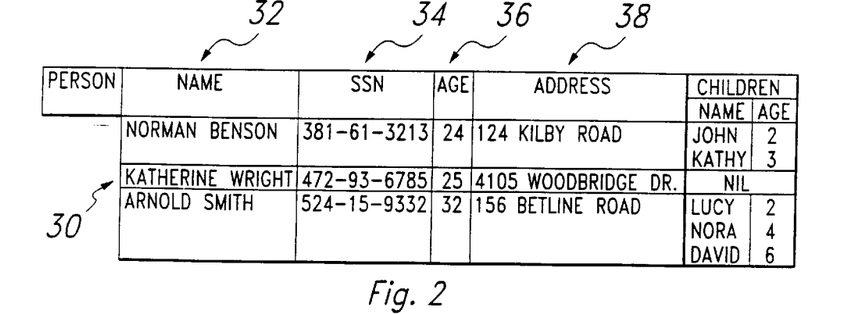
FIG. 2 is a block diagram showing an example of data that with current art cannot be represented in the relational model.

As mentioned above, the relational model represents data in tabular form. A tuple in a relation can only be formed from atomic values. Therefore, information about a person and all his/her children, (as seen in table 30 of FIG. 2) cannot be represented in a single relation. Additionally, the relational model cannot handle inheritance or user-defined abstract data types defined by the host language. This is because the type systems of the host and query languages are different.

The object-oriented approach to modeling data provides a better match between real world entities and the way they are represented in a database. A central concept in this approach is the concept of an object which is an abstraction of a thing in the real world that is relevant to the application. An object is formed from two main components: its state and its behavior.

The state consists of a collection of attributes (also called instance variables, data members, or slots). The attributes can be viewed exactly as the attributes of a tuple representing a real world entity in the relational model. The behavior consists of a collection of functions (also called operations, methods, or member functions) that encapsulate the behavior of the object. The collection of functions that model the behavior of an object is also referred to as the object's interface and is the only way to interact with an object. An important property of an object is that its private state can be manipulated only by its own operations. This property ensures that the implementation of an object cannot depend on the internal details of other objects, only on their operations ensuring modularity and data independence of applications because they specify what operation is desired, but not how the operation should be accomplished.

TABLE 2

Some relationships between relational and object-oriented concepts.

| Relational Concept | Object-oriented Concept |
|---|---|
| Relation schema | Class or Type |
| Attribute | Attribute, data memeber, slot |
|  | Function, method, operation, member function |
| Tuple | Object |
| Relation | Set of objects |

A class (or type) describes the implementation of a set of objects of the same kind. Every object, sometimes called instance, must belong to a class. Table 2 demonstrates the correlation between relational and object-oriented concepts.

TABLE 3

Components of a class definition.

| class name | Employee |
|---|---|
| superclass | Person |
| attributes | Hire_date, Job_grade, |
|  | Salary, Project |
| functions | Hire_employee, Increase_salary, |
|  | Assign_project, Promote_employee |

Table 3 illustrates the main components of an example class definition.

Unlike relations, classes are organized into an inheritance hierarchy. A class can be refined or specialized in a subclass that will inherit its behavior. The Employee class of Table 3 declares that the objects of the class inherit the behavior of the Person class which is the ancestor of Employee in the hierarchy. The relational model does not have these notions of behavior and inheritance.

In the object-oriented model, an object can be composed of other arbitrarily complex objects. For example, d car object is composed of a chassis and a body objects. A chassis in turn is composed of a frame, wheels, and engine objects.

Every object has an object identity that uniquely identifies the object and is independent of the object's state. This allows an object to be referenced by other objects so that it can be shared. In contrast, in the relational model tuples (the object of the model) cannot be shared. A tuple is fully identified by the values of its attributes and there cannot exist two tuples in a relation with the same values in all their attributes.

Consider now the C++ programming language as an example of an object-oriented data model. The C++ data model includes a set of predefined (built-in or primitive) data types which include: character, integer, long, short, float, and double. These primitive types can be used to define more complex types.

A class is the mechanism for defining such a complex type that determines the state and the behavior of a collection of objects. The definition of a class involves specifying a set of data members (attributes or instance variables) and a set of member functions (operations or methods). A class member (a member function or a data member) can be declared as public, private, or protected. A public member can be accessed from anywhere in a program. A private member can be accessed only by the member functions of its class. A protected member can be accessed by the member functions of its class as well as the member functions of the classes derived from it. An abstract data type is a class that has a public set of member functions and no public data members (all its data members are declared private or protected).

When defining a class, the type of each of its data members is specified. The type of a data member can be one of the predefined data types (integer, float, etc.) or it can be another user-defined type. This capability in C++ allows for building aggregation (sometimes referred to as composition) hierarchies or graphs to represent complex objects, which are recursively defined in terms of other objects. Recursive definitions in which a data member of a class points back to the same class are also possible.

A class can also be derived from one or more base classes, thereby supporting single and multiple inheritance. A derived class can itself serve as the base class for other derivations and this allows for building generalization hierarchies or lattices. A derived class inherits all of the public and protected members of its base class and is referred to as a subclass (subtype) of its base class. Private members of a base class are not accessible from any other classes including derived classes.

The C++ programming language is a good basis for a data model since it overcomes many of the relational data model limitations discussed previously, including the representation of arbitrarily complex objects, inheritance, and user-defined abstract data types. However, C++ still has some limitations as a database system because it cannot handle persistent data, concurrency control, or recovery; in addition, C++ lacks support for a SET type and lacks associative query mechanisms. Overcoming these latter limitations is desirable.

Previous object-oriented query languages can be classified into two groups. Those that are extensions to SQL and those that attempt to add a query capability to C++. Until the present invention, no previous approach provided a combination of the two.

Examples of such object-oriented query languages are OSQL, RELOOP, and O++. OSQL is the query language of the IRIS object-oriented database management system prototype developed at Hewlett-Packard. RELOOP is one of the query languages of the $O_2$ object-oriented database management system prototype developed at Altaïr. Both OSQL and RELOOP are based on SQL, but they do not allow host language expressions in queries and are not therefore tightly integrated with a programming language.

O++, a database programming language derived from C++, is the language of the ODE database system prototype developed at AT&T. O++ includes in its syntax, iterator expressions (e.g., foreach) that allow sets of objects to be manipulated almost as declaratively as relational query languages. O++ is based on C++ but the basic structure of query statements does not use the SELECT-FROM-WHERE (SFW) form of SQL. O++ is a nonstandard language requiring a nonstandard and expensive compiler, and like OSQL and RELOOP, can only query persistent objects and not transient objects.

Also, in conventional databases, data is translated by application program code to and from the program data model to the database data model every time data is shifted between the two. The Carnegie-Mellon MACH project reports that 90% of applications that share data do so on the same machine type and the same programming language. By translating the language data model to some other data model (e.g., relational), the database programming language community pays for a mapping (translation cost from language data model to neutral data model) 100% of the time when it is required only 10% of the time. It is desirable to have this happen only if needed to share data among different programming languages that used different data models. Further, since the translation is left to programmers, this introduces a chance of errors and inefficiencies. As much as 30% of applications that access databases is spent in programmer code to perform such mappings, a major drain on programmers productivity. In addition, by leaving this translation up to application programmers, the type-safe, strong-typing is potentially broken (not guaranteed by the system) exactly at the program-database interface. this loss of strong typing at the database-program interface is a big problem because, within programs, type-safe behavior is viewed as a major feature and the data stored in the database is viewed as an enterprise's chief resource. Today's database systems do not maintain type-safety at this interface; tomorrow's must.

Lastly, no known OODBMS supports a seamless integration between the query and host languages. Generally, query languages are embedded in host languages in an ad hoc manner, not by seamlessly extending the host language with sets and queries.

SUMMARY OF THE INVENTION

In view of the above problems associated with the related art, it is an object of the present invention to provide an apparatus and method for achieving better integration (also known as seamlessness) between a query and an object-oriented host programming language.

Another object of the present invention is to provide an apparatus and method that makes database programming more accessible to programmers using a specific host language.

Another object of the present invention is to provide a method and apparatus that retains strong typing at the query interface, thereby making database programming much easier and more reliable than conventional SQL embeddings.

Other objects of the present invention are to provide an apparatus and method that enables the formulation of queries not only on persistent but also on transient collections of objects, enables user-defined functions written in the host language to be used in the formulation of queries, enables queries to be freely mixed with host language statements expecting a set object, enables support of a SET type so that complete collections of objects returned by queries are available in the host language, enables support of data abstraction, enables support of inheritance and composite objects in the formulation of queries, and provides a more uniform syntax and semantics of the query and host languages.

These objects are accomplished in a preferred embodiment by providing an apparatus and method to be known as Object Query Language (OQL). The term "OQL" refers to the specific method of extending any object-oriented host language with associative query statements, while "OQL [C++]" refers to the particular coupling of OQL with C++ which allows certain C++ expressions to be used in the formulation of queries. Where the specific host language is not important, the term "OQL[X]" will be used to designate a coupling of OQL with a host language X, where X is, for example, C++, CLOS, Smalltalk, Objective-C, etc.

Basically, OQL adopts the SELECT-FROM-WHERE (SFW) structure of the SQL SELECT statement and allows appropriate statements of the host language to be combined within queries. The SFW structure of SQL was adopted because it provides a standard model for the formulation of queries in object-oriented host languages that currently enjoys wide use in database applications.

The preferred embodiment, OQL[C++], extends the type system of C++ with the support of a parameterized set type, thereby enabling C++ to handle sets. Thus the invention is more than an embedding of a query language in C++ in that it provides a seamless integration between query and host languages by allowing the sets returned from an OQL[C++] query to be used in any place within a C++ program expecting to handle a set (e.g., a parameter to a C++ function), allowing set-valued C++ functions to be used in the FROM clause of an OQL[C++] statement, and allowing Boolean-valued C++ functions to be freely combined as part of a predicate in the WHERE clause of an OQL[C++] statement. This seamlessness with respect to language occurs because C++ is being extended with sets of records and operations on sets.

Unlike many of the existing object-oriented query languages, the preferred embodiment of the present invention achieves a better integration with the object-oriented programming language, C++. The design objectives achieved by the preferred embodiment of the present invention are: minimal data model dependency by using the type system of the programming language as a bare-bones data model, data abstraction by restricting queries to use the object's public interface, orthogonal treatment of classes as types and classes as type extents by supporting user maintained class extents, persistence orthogonal to query processing by allowing queries on transient as well as on persistent sets, and a reduced impedance mismatch between the programming and query languages by using the same type system for both languages.

OQL[C++] is minimally data model dependent. This is achieved by assigning only the knowledge of the type system of the host language (in this case C++) as a "barebones" data model rather than defining a new proprietary data model from scratch. C++'s concepts of object, class, data member, member function, inheritance and composition of class definitions provide the core of most object-oriented data models.

OQL[C++] supports data abstraction by forcing all queries to be formulated through the object's public interface (member functions), thus hiding the object's internal representation. This is achieved by the parsing module 102 (see FIG. 7) of OQL[C++] which consults the run-time data dictionary 112 containing all class information and disallows any query statement that is formulated on anything different than the class' public interface. A query that is incorrectly formulated in terms of the object's private data members or member functions results in a syntax error 122 illustrated in FIG. 7. This makes the principle of data independence (i.e., the immunity of applications to changes in the data structures used to organize data), which is one of the major advantages introduced by the relational model, to be preserved in object-oriented database queries.

Figure 3:
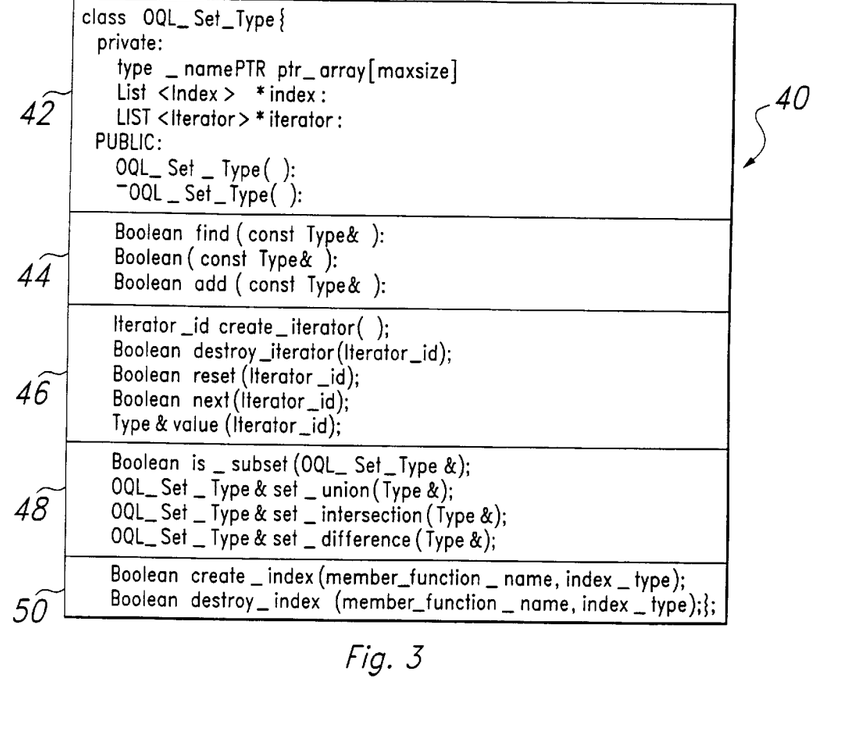
FIG. 3 is a block diagram showing the interface of the set class declaration according to the present invention.

OQL[C++] supports explicit, user-maintained sets by requiring programmers to define variables of type OQL__SET in their programs. This makes the concepts of class definition and class extent (the set of instances of a class) to be orthogonal. As a result of this, not all classes may have sets associated with them and some classes may have not one but many sets associated with them, as it is the case in all database systems which support implicit sets. This is achieved by allowing a programmer to explicitly define variables of type OQL__SET and populating these sets using the membership functions of the OQL__SET type (see Block 44 of FIG. 3) rather than assuming implicit sets of objects associated with the class definition.

OQL[C++] allows queries on transient and persistent sets. In relational DBMSs and in all current OODBMSs, queries are performed exclusively on persistent data. In OQL, it is possible to define and query transient sets, that is, sets whose life span is a single program invocation. Returning now to FIG. 7, query of transient sets is achieved by maintaining a "run-time" data dictionary 112 that keeps track of all transient and persistent classes and set-valued variables defined by the application. Such data dictionary information is available to the OQL query processor 100 so that appropriate C++ or Persistent C++ code is generated. This makes the OQL approach to querying independent of whether data is maintained persistently in a DBMS or transiently in the memory of a computer. As a direct consequence of this independence, OQL can be used as a tool for supporting query statements in a host language.

Figure 7:
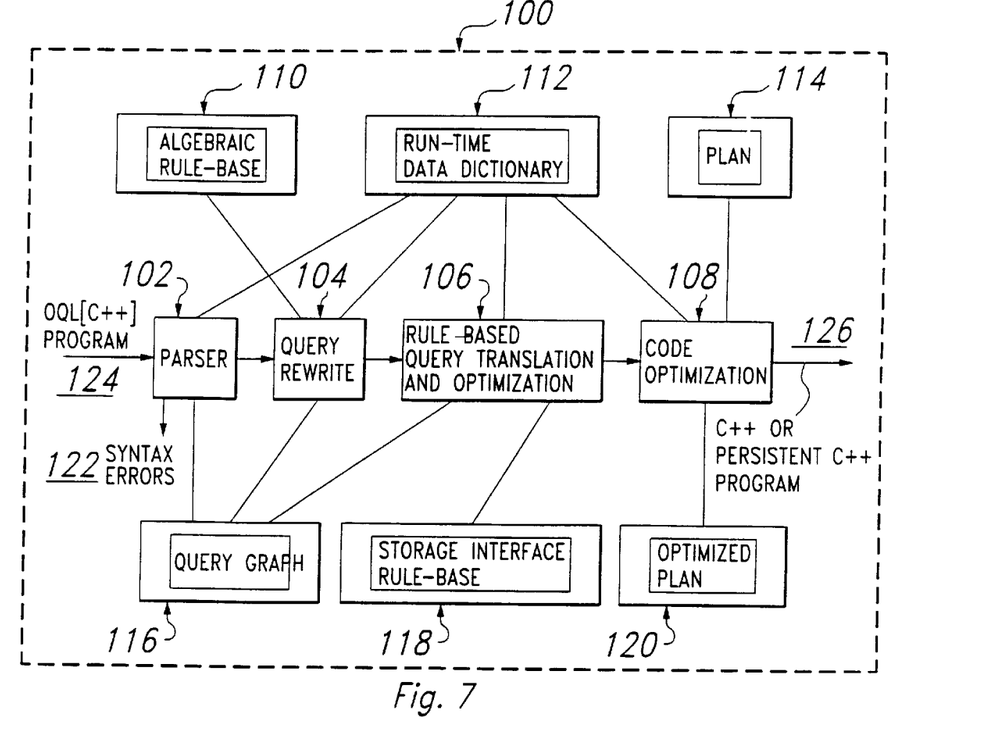
FIG. 7 is a block diagram of the query processor architecture according to a preferred embodiment of the present invention.

OQL[C++] provides a better integration with the host language by allowing certain host language concepts to be used in the formulation of queries. This is achieved by requiring typed range variables and user-defined set-valued functions in addition to OQL__SETs in the FROM-clause, user-defined Boolean-valued functions and inherited member functions in the WHERE-clause, and typed objects and substitutability in the SELECT-clause of a query. Since all information about the inheritance class hierarchy is available in the data dictionary 112, which is accessed by the parser 102, query rewrite 104, and query translation 106 modules, it is possible for the parser and query rewrite modules to recognize valid references to inherited member functions, and for the query translator to generate the appropriate C++ or Persistent C++ code equivalent to the query being processed. This enables the invention to be much more programmable than SQL without requiring the special purpose, yet-another-language extensions to SQL to extend its DML functionality.

Additionally, OQL[C++] provides elegant looping constructs for C++. The programmer can take advantage of SQL's relational calculus to specify what data needs to be retrieved and let the present invention map the higher level specification into loops that determine how to retrieve the data efficiently. The "what" is represented by the declarative OQL[C++] 124 being input to the query processor 100, and the "how" is represented by the C++ or Persistent C++ code 126 being output by the query processor. This increases the programmer's productivity by relieving him/her from the burden of determining efficient access paths and by making his/her code easier to write and to read.

In the present invention, data is translated between the program and the database data models by the application program code only when one needs to share data among different programming languages based on different data models. This generates sizable savings since the database programming language community no longer has to pay for this cost 100% of the time when it is only required 10% of the time. This translation between the host language and the database is achieved in relational and other existing systems by application code. In persistent programming languages, this is achieved by a system-maintained mapping that translates data structures in the run-time host language memory to/from external memory representations. OQL is meant to work with these latter persistent programming languages. In this case, persistence or transience of sets is achieved in a manner exactly analogous to persistence or transience of any other host language data structure.

These and other features and advantages of the invention will be apparent to those skilled in the art from the following detailed description of a preferred embodiment, taken together with the accompanying drawings in which:

DETAILED DESCRIPTION OF A PREFERRED EMBODIMENT

Although the preferred embodiment of the Object Query Language (OQL) of the present invention will be further described below in terms of its particular syntax and semantics with regard to its implementation with the C++ programming language, some additional background is required.

It should be realized that although the preferred embodiment to be described in detail below is OQL[C++], which provides a specific binding with C++ as a host language for data modeling an programming operations, OQL can be extended to other languages such as OQL[Cobol], OQL [CLOS], OQL[Smalltalk], etc. adding query capabilities to other programming languages as well. OQL can be generalized to OQL[X], where X is a data model, including a generic, language-neutral semantic data models; and domain-specific data models for Computer-Aided Design (e.g., Extended Data Interchange Format or EDIF), Computer-Aided Software Engineering (e.g., TI's Information Engineering Facility), Knowledge Representation (e.g., Carnegie Group Initiative's ROCK), Office Information Systems (e.g., Office Data Architecture, SGML), etc. OQL [X] defines a family of bindings between a query language and either a host language or a data modeling environment. Therefore, the present invention should in no fashion be limited to only a C++ coupling.

The syntax of OQL[C++] is based on the SFW paradigm of SQL, but extended with C++ expressions. The SFW paradigm of SQL is considered to be data model independent because it can be used to query not only relational data but data represented by other models, as evidenced by the large number of SQL extensions. The preferred embodiment of the present invention exactly combines the SFW paradigm of SQL with the data model of C++.

OQL[C++] is not an embedding in C++ because sets resulting from OQL[C++] queries can be used in any place in a C++ statement expecting a set (e.g., a parameter to a C++ function), sets returned by user-defined functions can be further queried, and user-defined functions can be combined as part of the predicates of queries.

OQL[C++] is a declarative and non-procedural language which means the programmer can take advantage of OQL [C++] to specify what and let OQL to be retrieved and let OQL map the higher level specification into loops that determine how to retrieve the data efficiently. This increases the programmer's productivity by relieving him/her from the burden of determining efficient access paths and by making his/her code easier to write and to read.

OQL[C++] is minimally data model dependent. This is achieved by assuming only the knowledge of the type system of the given host language (in this case C++) as a data model instead of defining a new proprietary data model from scratch. OQL[C++] adopts the object-oriented data modeling concepts and semantics of C++ including the concepts of object, class, data member, member function, inheritance, composition of class definitions, and message dispatch which together provides a core of concepts found in most object-oriented data models. OQL[C++] extends C++ with queries and sets. The uniformity of the type systems of the host and query languages achieved in OQL[C++] retains strong typing at the query interface, making database programming much easier and more reliable than conventional databases.

OQL[C++] is specially useful to CA* (e.g., CAD, CAM, CASE) tool and application developers. A major requirement of these applications is to provide database amenities (i.e., persistence, recovery, concurrency control and queries) within the programming environments in a transparent (seamless) way. The present invention achieves this reduced impedance mismatch between the query and the host languages, by starting from the C++ programming language. Persistence, recovery, and concurrency control were added to C++ without requiring a new compiler. Then, a query capability which includes a language that blends features of SQL, and some of its proposed variations with the syntax of the host language (C++), was added.

The present invention achieves data abstraction. One of the most important concepts of the object-oriented approach to software development is data abstraction, wherein the data representation of an object is hidden from the application and all interactions with objects are made through the object's public interface. The present invention achieves data abstraction thereby, making applications data independent (i.e., invariant to changes in the representation of the objects). Thus, data independence, one of the major advantages of relational database systems, is preserved in OQL [C++]. Data abstraction in the present invention is enforced by requiring that all query predicates be formulated in terms of the object's public interface. It should be noted that the principle of data abstraction is strictly enforced only from the user's or application's point of view, thereby leaving open the option for OQL[C++]'s internal modules (e.g., the query optimizer) to have access to the object's representation.

The support of sets in an OODB system may be implicit or explicit. Implicit support means that sets of objects are collected implicitly as part of a programming language construct (e.g., class). For example, in a relational system, when tuples (the objects of the system) are created, they are implicitly added to a corresponding set (i.e., a relation). On the other hand, explicit sets are declared and maintained by a user. The present embodiment supports explicit, user-maintained sets, but is not limited to handling only explicit sets.

Consider an example class Patient defining information about patients in a hospital. In addition to the sets of all patients in the hospital, it may be convenient to allow the declaration of special sets of patients such as laboratory patients or pediatrics patients. In OQL[C++], sets of objects are declared and maintained explicitly by the user because it is undesirable that applications be forced to pay the overhead of maintaining implicit sets for classes that may not be queried.

In conventional database management systems (e.g., relational) and in all current object-oriented database management systems, queries are performed exclusively on persistent sets. In CA* environments and applications, a large amount of transient data is generated for which set-oriented query access is essential. OQL[C++] provides the advantages of associative access to transient sets of objects as well. Because the present invention is an extension to C++, it is possible to define and query transient sets, that is, sets whose life span is a single program invocation.

Sets are declared and defined using the DECLARE and IMPLEMENT statements, respectively. OQL[C++] sets, according to the preferred embodiment, are parameterized

TABLE 4

Set declaration statement grammar.

<set-declare> := DECLARE [PERSISTENT] OQL_SET <class-name>
 [(HASHED|B-TREE) INDEX ON <member-list>] ;
<member-list> := <member-function-name> [, <member-list>] ;
<class-name> := <identifier> ;
<member-function-name> := <identifier> ;

sets declared using the statement DECLARE OQL_SET <class-name>, where DECLARE is a keyword that a preprocessor understands and class-name is the name of a previously declared class. The syntax of the set declaration is illustrated in Table 4. In the present embodiment, such a (transient or persistent) set can be declared only on classes, not on basic types (integer or character string).

The DECLARE statement causes the preprocessor to generate the necessary C++ code to declare an OQL[C++] set class. The code generated as a result of the DECLARE statement is illustrated by the code fragment 40 of FIG. 3. The public interface of the set class includes member functions to populate the set (Block 44), to iterate through the members of the set (Block 46), to perform set operations (Block 48), and member functions to maintain indices on the set (Block 50). The iterator data member of the OQL[C++] set is used to keep track of separate concurrent iteration requests on a set. Each iterator is uniquely identified by an iterator-id.

The statement IMPLEMENT OQL_SET <class-name> expands the definition of the member functions of a set into appropriate C++ code that executes the intended functions.

Figure 8:
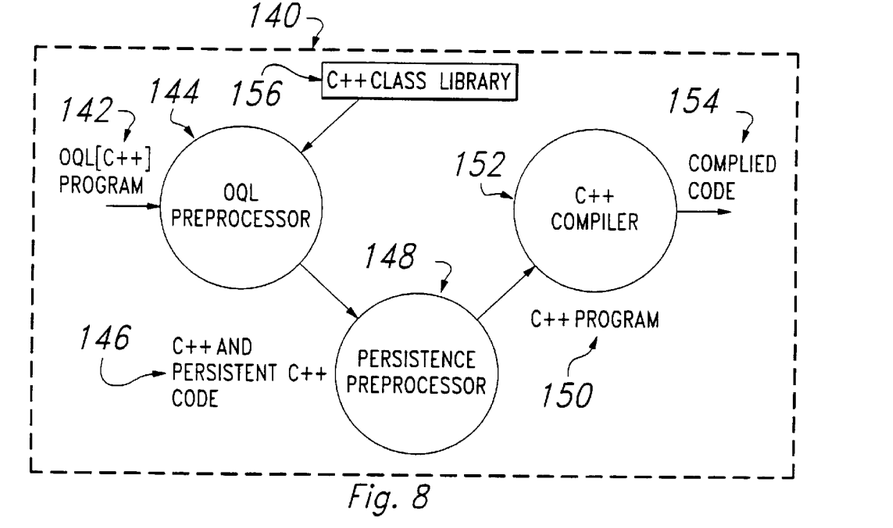
FIG. 8 is a diagram of the preprocessing stages required to compile a program written according to the present invention.

During the OQL preprocessing stage 144 (FIG. 8), DECLARE and IMPLEMENT statements are recognized and transformed into C++ or Persistent C++ code that describes the declaration and implementation of the OQL sets. Also, during this preprocessing stage, OQL query statements are identified, parsed, optimized and translated (Block 100, FIG. 7) into efficient C++ or Persistent C++ code (depending on whether the set is a persistent set) that computes the query. The resulting program is then compiled by the C++ compiler 152 (FIG. 8).

Figure 4:
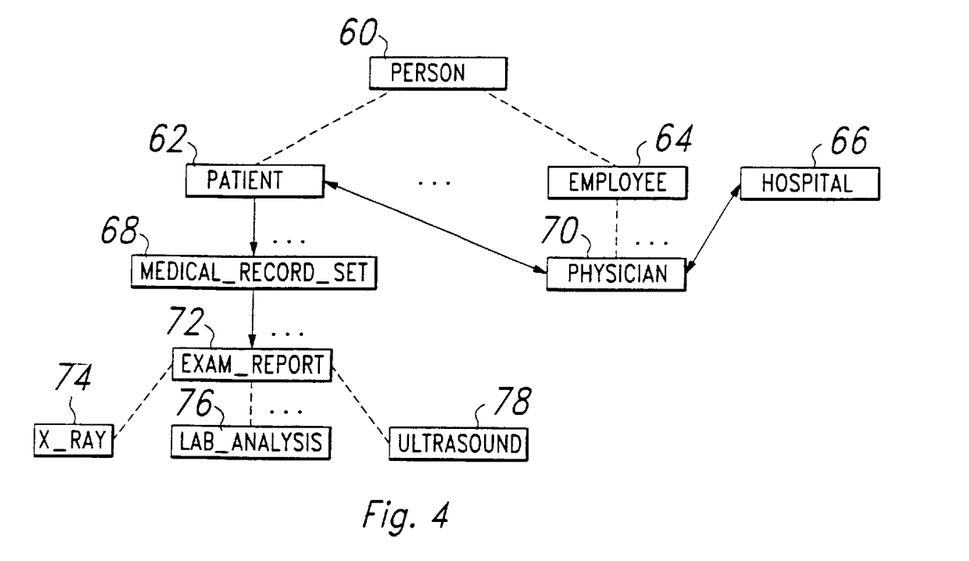
FIG. 4 is a schematic of an example class hierarchy describing a hospital database schema.

The following examples are based on the schema illustrated by FIG. 4 which represents example clinical information about patients in a hospital. Names in the graph represent classes. Classes connected by a continuous line represent composition. Inheritance among classes is represented by dashed lines.

The structure of an OQL query is:

SELECT <objects>
FROM <range variable> IN <set>
WHERE <predicate>;

The syntax of the present invention borrows the SFW paradigm of SQL in an upwards compatible way and enhances it in several ways. The SELECT clause identifies the objects that will populate the answer set (i.e., the result of the query). More about the type of objects that can be specified in the SELECT clause is discussed below. The FROM clause specifies the type of the objects in the target set, the set being queried, by means of a range variable. Finally, the WHERE clause specifies the predicate that defines the properties to be satisfied by the objects in the result.

EXAMPLE 1

Retrieve patients insured by Aetna

SELECT p
FROM Patient *p IN Patient_Set
WHERE p->get_insurance( )->company=="Aetna"

In this example, p is a range variable of type pointer to a patient in class Patient 62, and is declared in the FROM clause. The use of p in the SELECT clause indicates that the answer set will consist of a set of pointers to patients 62. The use of typed range variables facilitates compile-time type-checking and the ability to formulate predicates in a syntax similar to C++.

Figure 5A:
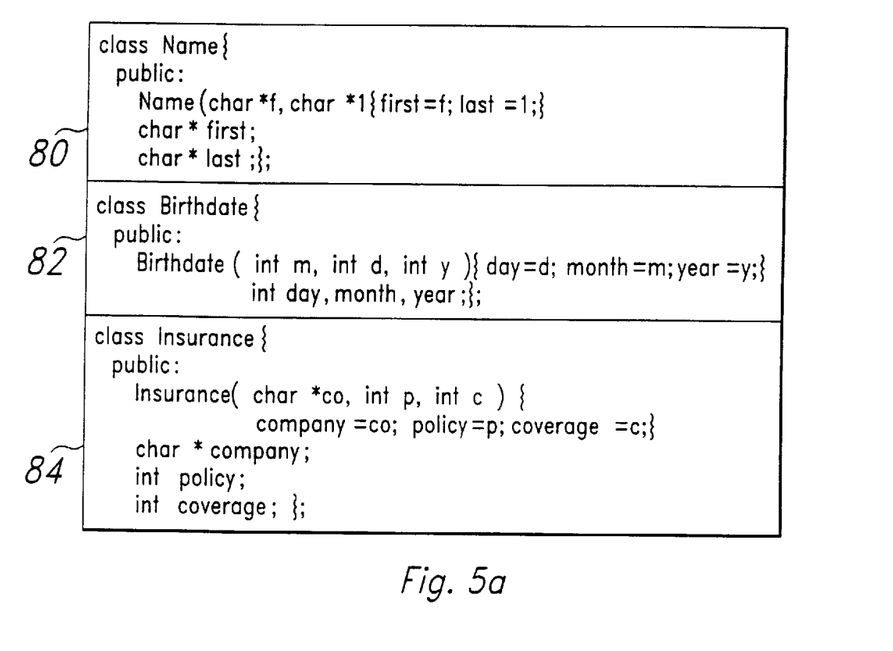
FIGS. 5a–b are block diagrams showing examples of C++ classes.

Patient_et 62 is a (target) OQL set containing objects of type Patient 90 as seen in the hospital scheme of FIG. 4. It is possible to specify any set-valued expression (e.g., a variable or user function) as a target set in the FROM clause. Other classes defined in FIG. 4 are Name 80 (FIG. 5a), Birthdate 82, Insurance 84, Person 86, Physician 88, and Patient 90.

The string p->get insurance( )->company is called a path expression and it allows the formulation of predicates on values deeply nested in the structure of an object. If t is a range variable of type T (T *), then: (a) t and t.m( ) (t->mo) are path expressions where m is a member function of class T; and (b) if p is a path expression, then p.m( ) (p->m( )) is a path expression. The function m is a member of the class T or its ancestors. There may be single-valued or set-valued path expressions. The importance of this distinction will be described below.

The use of path expressions and the declaration of typed range variables are two features of the present invention not available in SQL.

All predicates in the WHERE clause are expressed in terms of the object's public interface, that is, no predicates on private data members or functions are allowed. Currently, it is a user's responsibility to ensure that the member functions in predicates are side-effect free, that is, their invocation does not change the state of any object in the database.

Alternatively, the range variable could have been declared of type Patient 90, in this case the query would be written as:

SELECT p
    FROM Patient p IN Patient_Set
    WHERE p.Insurance( )->company=="Aetna";

In both forms of this query the expressions p. Insurance( ) and p->Insurance( ) return a pointer to an insurance structure 84. Therefore, in both cases the company name needs to be referenced using the arrow notation. Note that the arrow notation is directly from C++ and not part of OQL; OQL [CLOS] would use Lisp syntax and CLOS semantics for referencing instance variables and methods.

The purpose of the SELECT clause is to declare the type of the individual objects that will form the answer set. Example 2 illustrates a different use of the SELECT clause.

Example 2

Retrieve the patients insured by Aetna as a set of persons

Figure 5B:
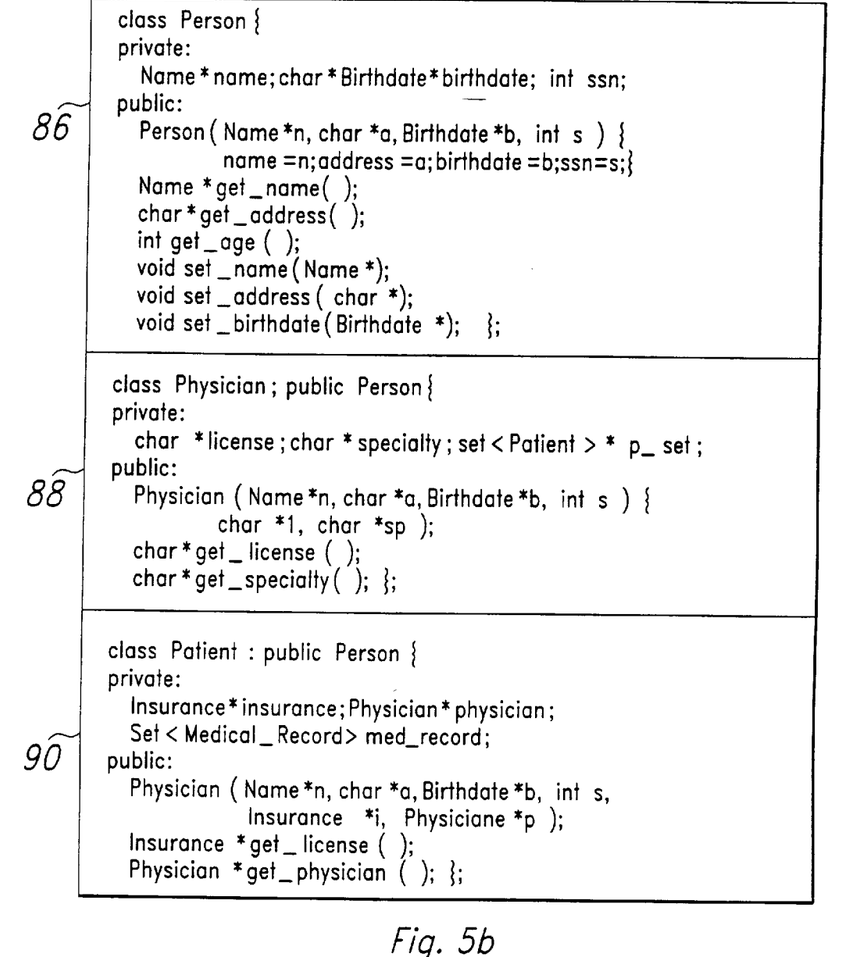

SELECT Person *x=p
    FROM Patient *p IN Patient_Set
    WHERE p->Insurance( )->company=="Aetna";

This example shows how the principle of substitutability (i.e., a program variable of a type may be assigned any object from a derived type) can be applied within an OQL query according to the present invention. In an OQL query, it is possible for the answer set to contain members whose type is the same as the type of the members in the target set, as well as any of its ancestor types. In this example, Person 60 (FIG. 4)/86 (FIG. 5b) is an ancestor of Patient 62 (FIG. 4)/90 (FIG. 5b). The variable x of type pointer to Person 60/86 is assigned a pointer to Patient 62/90. Notice that the object identity of the members in the target set is preserved in the answer set. However, the answer set object will have a new identity every time the query is executed.

A query according to the present invention may also return objects of a type that is unrelated to the class hierarchy of the type of the objects in the target set. This is illustrated in Example 3.

EXAMPLE 3

Retrieve the names and ages of patients no more than 10 years old

```
class New_Patient {
public:
    New_Patient( Name *, int *);
    "New_Patient();
    void set_name( Name& );
    void set_age( int& );
};
SELECT New_Patient w(p->get_name(), P->get_age())
FROM Patient *p IN Patient_Set
WHERE p->get_age() <= 10;
```

This query illustrates a use of the C++ constructor to create a set of objects of a new type provided that the new type is previously defined. The objects returned by this query have new identity. The query also illustrates the use of inheritance. The path expressions p->get_name( ) and p->get_age( ), used in the constructor and in the predicate of the WHERE clause, refer to member functions inherited by the objects of class Patient from the ancestor class Person.

Notice that inheritance of member functions is offered in OQL[C++] at no cost because it incorporates the C++ type system.

Other forms of inheritance (e.g., set inclusion) are possible in OQL even though they are not supported in C++. For example, in FIG. 4, given that Patient 62 and Employee 64 are classes derived from the class Person 60, one could expect that sets defined on these classes will carry set inclusion semantics. Set inclusion semantics means that any instance of type patient or employee which is a member of the set of patients 62 or the set of employees 64, respectively, becomes automatically an instance of the set of persons 60. This allows queries on the set of persons 60 to be executed not only on the instances initially created as persons, but also on instances of patients and of employees.

So far, all path expressions used in queries of Examples 1–3 have been single-valued. Example 4 demonstrates a case where a path expression is set-valued.

EXAMPLE 4

Retrieve patients of Dr. Smith who have been diagnosed with flu prior to Oct. 10, 1989

```
SELECT p
FROM Patient *p IN Patient_Set
WHERE p->get_physician()->get_name()->last == "Smith" &&
    EXISTS ( SELECT r
        FROM Medical_record *r IN p->get_med_record()
        WHERE r->get_date() < "10/10/89" &&
            r->get_diagnosis() == "flu" );
```

Because the path expression p->get_med_record( ) is set-valued (i.e., the function get_med_rec( ) of patients returns a set of medical record 68 objects), it is necessary to define a variable r to range over the members of that set. This leads to the use of subqueries nested within an OQL statement. Requiring the use of an explicit range variable for queries involving set-valued path expressions rather than having OQL define them implicitly yields a cleaner semantics and a simpler implementation of the present invention.

The predicate EXISTS <set> evaluates to true whenever <set> is not empty. This is compatible with the corresponding predicate in SQL. Predicates in the WHERE clause can use comparison operators $\theta \in \{==,<,<=,>,>=,!=\}$, and logical operators && (AND), || (OR), and NOT. C++ syntax is used for comparison and logical operators. Valid atomic terms are: $t_1 \theta t_2$, $t_1 \theta c$, $t_1$ IN $s_1$, $s_1$ CONTAINS $s_2$, $v \theta$ ALL $s_1$, $v \theta$ ANY $s_2$, and EXISTS $s_1$; where $t_1$ and $t_2$ are single-valued path expressions, $s_1$ and $s_2$ are sets, $v$ is a single-valued path expression or a constant, c is a constant (integer or string), and $\theta$ is a comparison operator. The atomic terms involving ANY and ALL are used for existential and universal quantification, respectively. A predicate is a Boolean combination of atomic terms.

It should be apparent that from the point of view of the user, both inherited member functions and composite objects are referenced uniformly in the present invention through a single syntactic mechanism (i.e., the path expression).

EXAMPLE 5

Retrieve all pediatricians and their Aetna-insured patients

```
class New_Patient {
public:
    New_Patient( Name *, Set<Name> * );
    "Name_Patient();
    Name * get_dr_name();
    Set<Name> * get_pat_set();
};
SELECT New_Patient w( p->get_name(),
```

```
                SELECT Name n(pat->get_name())
                FROM Patient *pat IN p->Patient_Set
                WHERE pat->Insurance()->com-
                    pany=="Aetna" )
FROM Physician *p IN Physician_Set
WHERE p->specialty() == "Pediatrics";
```

This query illustrates the principle of orthogonality within OQL itself. A SELECT statement can be used anywhere a set is expected, in this case, in the constructor of a New_patient object.

The scope of a range variable is the whole Select statement associated with the FROM clause that defines it. This allows the variable p declared in the outer SELECT statement to be used in the inner SELECT statement. In contrast, the variable pat declared in the inner Select cannot be used in the outer one. This is exactly consistent with ANSI SQL scoping rules.

EXAMPLE 6

Retrieve patients having X-ray exams matching a tuberculosis of the lungs pattern

```
X_Ray_List *f( Patient * p ) {
    X_Ray_List * x = p->med_record()->exam_list.extract(X_RAY);
    return( x );
}
X_Ray_Set * Make_set( X_Ray_List * 1 ) {
    X_Ray_Set * x;
    x = new X_Ray_Set;
    1.reset();
    for( X_Ray * p = 1.value(); !(1.end()); 1.next() ){
        x.add( p );
    };
    return( x );
}
SELECT p
FROM Patient *p IN Patient_Set
WHERE EXISTS ( SELECT *
            FROM X_Ray_Set *r IN Make_set( f( p ) )
            WHERE x_ray_match( r->picture(),
            Bitmap *pattern )
        )
```

The query of Example 6 illustrates the use of set-valued, user-defined functions in a OQL statement. Assume every medical record of a patient contains a heterogeneous list of laboratory exams (e.g., X-rays 74, ultrasounds 78, blood tests 76). To perform a query on a set of X-rays 74, it is necessary so first extract the X-ray objects from the list of laboratory exam reports 74 (performed by f above) and then make the list into a set (performed by function Make_et above). This is necessary because OQL can only query sets of homogeneous objects. The user-defined (Boolean) function x_ray_match compares the bit pattern r->picture( ) of an X-ray with program variable of type Bitmap holding a typical tuberculosis pattern.

Data abstraction allows OQL[C++] queries on composite objects to be formulated using a uniform mechanism (i.e., path expressions) without regard to the way composition is implemented. This is illustrated by Example 7.

EXAMPLE 7

Retrieve patients whose ages are less than 19 years old and who are treated by physicians who work for hospitals located in Dallas

```
SELECT p
FROM Patient p IN Patient_Set
WHERE p.age < 19 &&
    p.get_physician().get_hospital().location() == "Dallas"
```

Other query languages that do not support data abstraction require different formulations for queries on composite objects depending on the way the composite relationships are implemented. In these languages, an explicit join with objects returned by a nested query is necessary to express the above query as shown below.

```
SELECT p
FROM Patient p IN Patient-Set
WHERE p.age < 19 &&
    p.physician IN (SELECT s.Physician
                FROM Hospital s IN Hospital_Set
                WHERE s.location == "Dallas")
```

Figure 6:
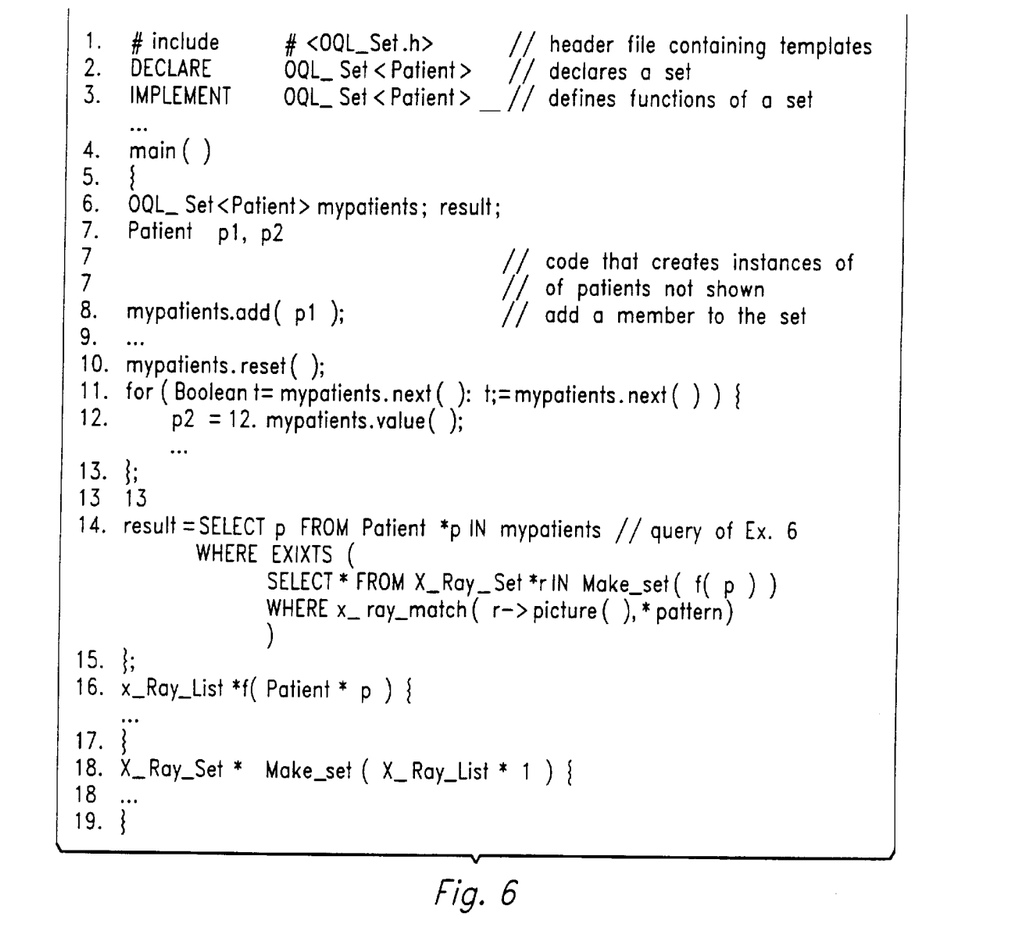
FIG. 6 is an example of code showing an improved coupling of a query language with a host language according to a preferred embodiment of the present invention.

Statements 2 and 3 of FIG. 6 show how to declare and define a set of patients according to the present invention. Statement 6 declares two program variables mypatients, and result of type OQL set of patients. Statement 8 shows how sets are populated using the add member function. Statements 10–12 demonstrate how to iterate through all the individual members of a set. Statement 14 shows the query of Example 6 on the set mypatients. Note the use of user-defined functions as part of the program. Statements 16–19 represents code that defines the functions f and Make_set.

To aid in the implementation of the preferred embodiment, of the present invention, the grammar of OQL[C++] follows.

```
oql
    : set_expression
    : query_expression
    | QUIT
    ;
set_expression
    : declare_spec
    | implement_spec
    ;
declare_spec
    : DECLARE set_ref index_spec
    | DECLARE PERSISTENT set_ref index_spec
    ;
set_ref
    : OQL_SET '<' IDENTIFIER '>'
    ;
index_spec
    : HASHED INDEX ON member_ref_commalist
    | B-TREE INDEX ON member_ref_commalist
    ;
member_ref_commalist
    : member_ref
    | member_ref_commalist ',' member_ref
    ;
member_ref
    : member_function
    ;
member_function
    : IDENTIFIER
    ;
implement_spec
    : IMPLEMENT set_ref
    ;
query_expression
    : query_term
    | query_expression UNION query_term
```

```
;
query_term
      : query_spec
      | '(' query_expression ')'
      ;
query_spec
      : SELECT selection container_expression
      | SELECT DISTINCT selection container_expression
      ;
selection
      : TIMES
      | ALL
      | value_expression_commalist
      | value_constructor
      ;
container_expression
      : from_clause
      | from_clause where_clause
      ;
from_clause
      : FROM table_ref_commalist
      | FROM set_ref_commalist
      ;
table_ref_commalist
      : table_ref
      | table_ref_commalist ',' table_ref
      ;
table_ref
      : table
      | table range_variable
      ;
set_ref_commalist
      : set_ref
      | set_ref_commalist ',' set_ref
      ;
set_ref
      : object_ref IN set_expression
      ;
object_ref
      : IDENTIFIER range_variable
      | IDENTIFIER pointer_variable
      ;
set_expression
      : set
      | function_expression
      ;
where_clause
      : WHERE search_condition
      ;
search_condition
      : boolean_term
      | search_condition OR boolean_term
      ;
boolean_term
      : boolean_factor
      | boolean_term AND boolean_factor
      ;
boolean_factor
      : boolean_primary
      | NOT boolean_primary
      ;
boolean_primary
      : predicate
      | '(' search_condition ')'
predicate
      : comparison_predicate
      | existence_test
      | function_expression
      ;
comparison_predicate
      : value_expression comparison value_expression
      | value_expression comparison subquery
      | path_expression comparison path_expression
      | path_expression comparison value_expression
      ;
comparison
      : COMP_EQ
      | NE
      | LT
      | LE
      | GT
      | GE
      ;
existence_test
      : EXISTS subquery
      ;
subquery
      : '(' query_spec ')'
      ;
value_expression_commalist
      : value_expression
      | value_expression_commalist ',' value_expression
      ;
value_expression
      : term
      | value_expression PLUS term
      | value_expression MINUS term
      ;
value_constructor
      : object_ref
      | object_ref '[' assignment_expression_commalist ']'
      ;
assignment_expression_commalist
      : assignment_expression
      | assignment_expression_commalist ',' assignment_expression
      ;
assignment_expression
      : IDENTIFIER '=' query_expression
      | IDENTIFIER '=' path_expression
      ;
term
      : factor
      | term TIMES factor
      | term DIVIDE factor
      ;
factor
      : primary
      | PLUS primary
      | MINUS primary
      ;
primary
      : value_specification
      | '(' value_expression ')'
      ;
value_specification
      : literal
      ;
literal
      : IDENTIFIER
      | INTEGER
      | STRING
      ;
pointer_variable
      : TIMES range_variable
      ;
range_variable
      : IDENTIFIER
      ;
set
      : path_expression
      | IDENTIFIER
      ;
table
      : IDENTIFIER
      ;
path_expression
      : range_variable connector function_expression
      | path_expression connector function_expression
      ;
connector
      : ARROW
      | DOT
      ;
function_expression
      : primary '(' ')'
      | primary '(' parameter_commalist ')'
      ;
parameter_commalist
      :object_ref
      | path_expression
```

```
| function_expression
| parameter_commalist ',' object_ref
;
```

The approach used in OQL to provide a better integration with host languages can also be used by current SQL systems to provide a better integration with object-oriented programming languages.

The invention provides an elegant way to combine the computer industry's most used industrial strength object-oriented programming language, C++, with the industry's standard database query language SQL. The invention complements a C++ programmer's existing programming tools, by adding a query capability. This can result in better, more reliable C++ code and make database programming more accessible to the large number of C++ programmers.

The query processor architecture of OQL 100 is illustrated in FIG. 7. It consists of four main modules: parser 102, query rewriter 104, rule-based query translator and optimizer 106, and code optimizer 108. All these modules use the run-time data dictionary 112 that contains all type information of the application including class information (class names, data member names and types, and member function names types and parameters), class hierarchy information, and set-valued and Boolean-valued variables and functions used in the applications. The query processor takes as input OQL[C++]'s SELECT statements 124, and produces as output optimized C++ or Persistent C++ code 126. In FIG. 7, lightly shadowed boxes represent run-time data structures, darker boxes represent rule-bases, arrows connecting modules represent transfer of control, and continuous lines represent access to data structures from the corresponding modules. Parser 102 takes as input OQL[C++] SELECT statement and, with the help of the data dictionary, checks the syntax of the statement and whether references to class information and user-defined functions are valid. Syntactically incorrect statements are issued syntax errors 122 and syntactically correct statements are mapped into a query graph 116. After parsing, control passes to query rewrite module 104 which reads query graph 116 and transforms it in place after performing semantic and algebraic query optimization with the help of data dictionary 112 and algebraic rule-base 110, respectively. After query rewrite, control passes to rule-based query translator 106 which with the help of storage interface rule-base 118 and data dictionary 112 translates the query graph into a first version of an execution plan 114 written in C++ or Persistent C++. Finally, code optimizer 108 produces an improved sequence of C++ and Persistent C++ code 126 statements corresponding to original query 124.

The complete compilation process 140 of a program containing OQL[C++] statements (i.e., DECLARE, IMPLEMENT, and SELECT statements) is illustrated in FIG. 8. The input to the compilation process is a program containing OQL[C++] statements 142. This input is processed by the OQL preprocessor which, for SELECT statements, performs all the functions described in query processor 100 (FIG. 7). The OQL preprocessor produces a combination of C++ and Persistent C++ code 146 because of the possibility of a program querying transient and persistent data. A persistence C++ preprocessor 148 transforms Persistent C++ code into pure C++ code 150 and C++ code passes this process unchanged. C++ code 150 is then processed by a standard C++ compiler 152 which produces executable code 154.

Figure 9:
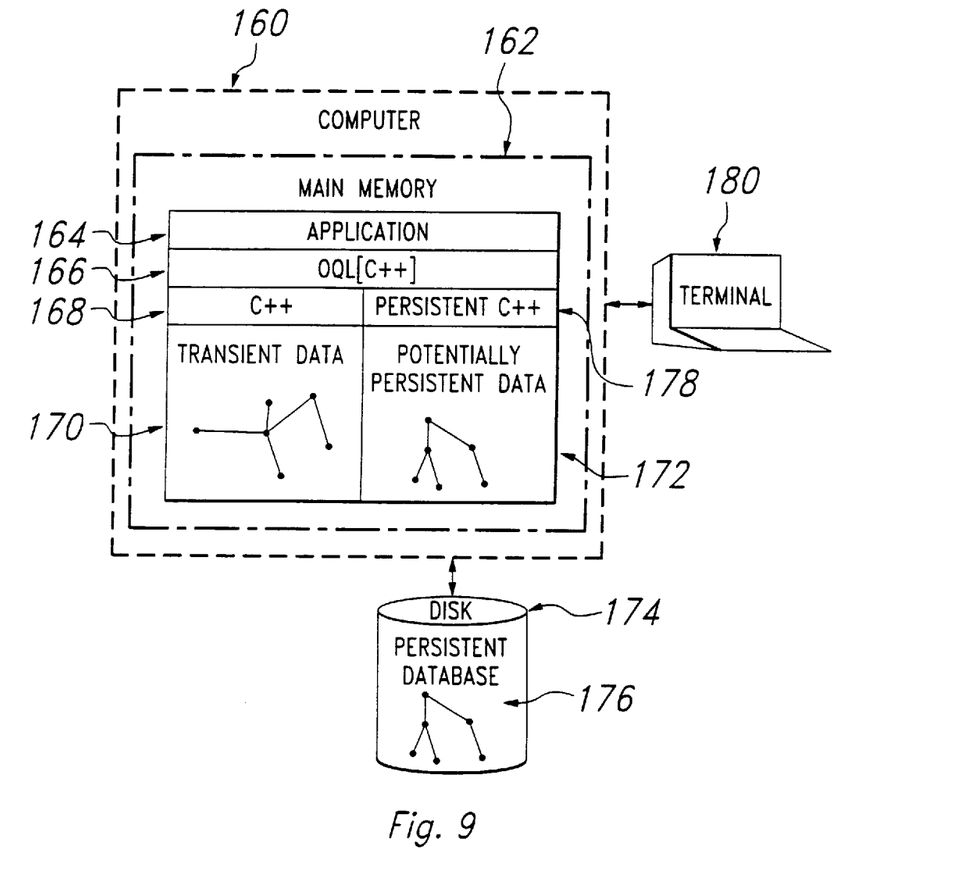
FIG. 9 is a block diagram showing the placement of an application of the present invention, C++ statements, persistent C++ statements, transient, and persistent data in the main memory of a computer.

FIG. 9 illustrates a possible placement of an application code 164 containing OQL[C++] query statements 166, according to a preferred embodiment of the invention, in the main memory 162 of a computer 160. During the development of the application, a computer programmmer enters a program to the computer 160 via a computer terminal 180. The application is compiled according to the process described in FIG. 8 where OQL[C++] statements 142 (FIG. 8)/166 (FIG. 9) are translated into pure C++ code 168 or Persistent C++ code 178 depending on whether queries access transient 170 or persistent data 172. Persistent data 172 is stored in a persistent database 176 on disk 174. Queries on transient data are performed using C++ code 168 in main memory 170. Queries on persistent data are performed using Persistent C++ code 178 which ensures the transfer of persistent data from the database 176 on disk 174 to a special area 172 of main memory 162 where the query is executed. It should be noted that although application code 164, OQL[C++] code 166, C++ code 168, and Persistent C++ code 178 are distinguishable before compilation, they are a single, indistinguishable piece of execution code after compilation.

The description of OQL[C++] as implemented by a a C++ preprocessor is specific to the implemented embodiment. If native C++ compilers (not implemented by preprocessors) were extended to use OQL, similar operations would be implemented by those compilers. In fact, if incremental C++ compilers become available, then OQL[C++] will be able to be similarly incremental and still inherit the "ad hoc" interactive ability to state queries. This feature would be inherited immediately in OQL[CLOS] when applied according to the present invention since CLOS allows incremental compilation.

While a specific embodiment of the invention has been shown and described above in this patent application, various modifications and alternate embodiments will occur to those skilled in the art. Accordingly, it is intended that the invention be limited only in terms of the appended claims.

We claim:

1. A method for enabling an integration of an object query language for an object-oriented data model with a host language, wherein queries for accessing objects in the object oriented data model are in said object query language, comprising the steps of:

constructing a preprocessor including a grammar coupling the object query language with the host language, wherein said grammar includes query statements to use expressions of the host language in accessing the objects and wherein said query statements access both transient and persistent objects by accessing a data dictionary having pointers to said transient and persistent objects to maintain information corresponding to both said transient and persistent objects;

using said preprocessor to preprocess said query statements by parsing, optimizing and translating at least one statement in said object query language into at least one statement of the host language; and compiling said statement of the host language into executable code.

2. A method for executing a query in an object query language operating in conjunction with a host language, comprising the steps of:

defining the object query language with set declarations;

formulating query statements by combining a type system of the host language as a database model with preselected aspects of a relational query language as a basic structure for said query statements;

preprocessing said query statements into host language statements, said host language statements to access transient and persistent objects by accessing a data dictionary having pointers to said transient and persistent objects to maintain information corresponding to both said transient and persistent objects;

compiling said host language statements; and executing said compiled host language statements to return at least one result in response to said formulated query statement.

3. The method of claim 2, wherein the method further comprises the step of defining said set declarations to include at least one membership function.

4. The method of claim 2, wherein the method further comprises the step of defining said set declarations to include at least one set operation.

5. The method of claim 2, wherein the method further comprises the step of defining said set declarations to include at least one iteration operator.

6. The method of claim 2, wherein the method further comprises the step of defining said set declarations to include at least one indexing function.

7. The method of claim 2, wherein said step of formulating query statements further comprises the step of combining boolean-valued functions of the host language with at least one predicate.

8. The method of claim 2, wherein said step of formulating query statements further comprises the step of setting targets for said queries by using set-valued functions of the host language.

9. The method of claim 2, wherein the step of formulating includes the step of providing SQL as said relational query language.

10. The method of claim 9, wherein said formulating step includes the step of providing Select-From-Where style of SQL as said preselected aspects.

11. The method of claim 2, wherein said step of formulating query statements further comprises the step of employing expressions of said host language and an object composition in the formulation of said query statements.

12. The method of claim 2, wherein said step of preprocessing further comprises the steps of:

parsing said query statements;

optimizing said query statements; and translating said query statements into statements compilable by a host language compiler.

13. A database system, comprising:

a transient object memory;

a persistent object memory;

a programming language processor connected to said transient object memory and said persistent object memory and accepting statements in a programming language comprising a host programming language and a query extension to said host programming language, wherein said query extension uses a type system of said host programming language as a database model; and a database processor connected to said transient object memory and to said persistent object memory, wherein query operations corresponding to said query extension of said database processor are directed by programs in said programming language, and wherein said query operations include access of objects in both said transient object memory and in said persistent object memory by accessing a data dictionary having pointers to said transient and persistent objects to maintain information corresponding to both said transient and persistent objects.

14. The database system of claim 13, wherein said programming language processor comprises:

a preprocessor for accepting said statements in said programming language and operable to parse, optimize, and translate additional statements in said query extension into host language statements.

15. The database system of claim 14, wherein said programming language processor further comprises:

a compiler connected to said preprocessor to compile said host language statements into executable code.

16. The database system of claim 13, wherein said query extension uses the SELECT-FROM-WHERE syntax of the SQL SELECT-FROM-WHERE statement of SQL.

17. The database system of claim 16, wherein said host programming language is Common Lisp Object System (CLOS).

18. The database system of claim 16, wherein said host programming language is C++.

19. The database system of claim 14, wherein said programming language processor is further operable to type check globally said host language statements and said query extension.

20. The database system of claim 13, wherein said programming language accepts types to be orthogonal to type extents.

21. The database system of claim 13, wherein said query extension includes query statements and wherein said query statements include host language expressions.

22. The database system of claim 21, wherein said query extension comprises user-defined functions in a FROM clause of said query extension.

23. The database system of claim 22, wherein said user-defined functions return a boolean value.

24. The database system of claim 21, wherein said host language expressions are predicates in query statements.

25. The database system of claim 21, wherein said host language expressions are query targets.

26. The database system of claim 13, wherein each of said objects include a public interface and wherein each of said objects are accessed through said public interface.

27. The database system of claim 13, wherein each of said programming language has a uniform syntax for query statements and host language statements.

28. The method of claim 13, wherein said preprocessing step includes the step of global type checking of said query statements.

29. A method for operating a database management system, comprising the steps of:

accepting queries;

parsing said queries, including the sub-steps of:
validating said queries in an object query language having a grammar for combining a type system of a host language as a data model with preselected aspects of a relational query language as a basic structure for said queries, said queries accessing both persistent objects and transient objects by accessing a data dictionary having pointers to said transient and persistent objects to maintain information corresponding to both said transient and persistent objects;

indicating as a syntactic fault a query not conforming to said grammar and rejecting said query;

globally type checking said queries;

translating said queries from said object query language into said host language;

compiling said translated queries; and executing said compiled queries.

* * * * *